Dec. 29, 1936.　　　G. W. HEISE　　　2,065,893
BATTERY
Filed Oct. 14, 1931
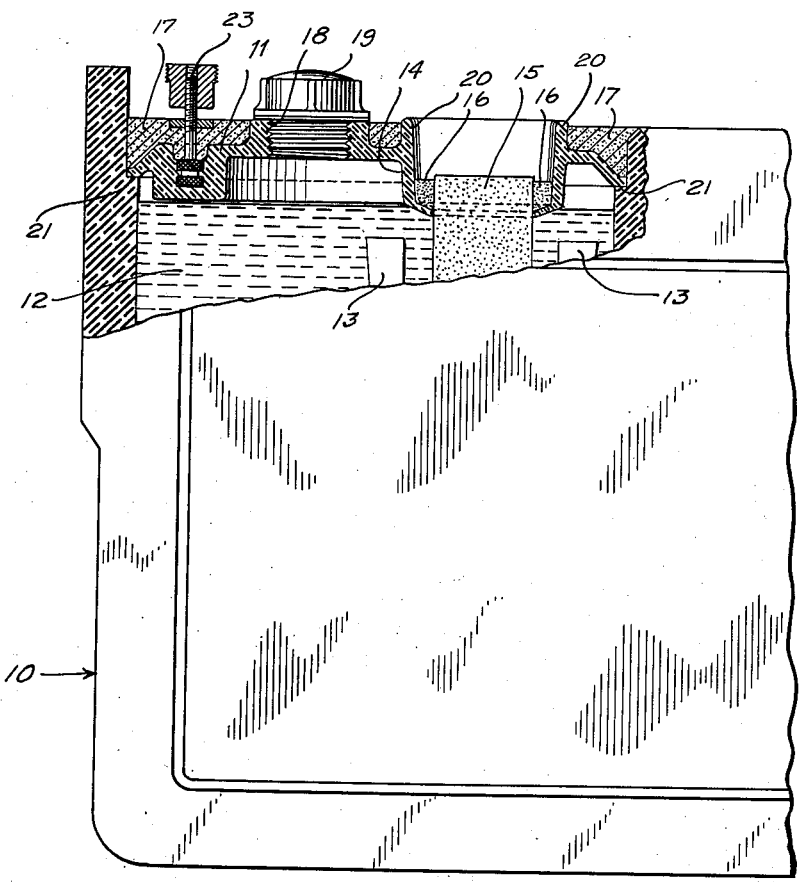
INVENTOR:
George W. Heise,
BY ATTORNEYS Patented Dec. 29, 1936

2,065,893

UNITED STATES PATENT OFFICE 2,065,893

BATTERY

George W. Heise, North Olmsted, Ohio, assignor, by mesne assignments, to Union Carbide and Carbon Corporation, a corporation of New York Application October 14, 1931, Serial No. 568,814

5 Claims. (Cl. 136—86)

The invention pertains to improved means for mounting a cathode in air depolarized cells of the type having caustic alkali electrolyte sealed therein, an anode immersed in the electrolyte, and a gas permeable, electrolyte-repellent carbon cathode partially immersed in the electrolyte and extending upward through the seal to the outer atmosphere.

One object of this invention is to provide a mounting for such a cathode that will prevent deterioration thereof by the absorption of water.

Another object is to provide an improved mounting for such a cathode whereby the detrimental effects caused by creepage of electrolyte up the side thereof is eliminated.

Another object is to provide an improved mounting that will increase the effectiveness of such an electrode by decreasing the distance from the atmosphere to the active surface thereof.

Other objects are to simplify the construction of such cells and facilitate their assembly. Still other aims and objects will be apparent from the following description and the accompanying illustration which is a longitudinal section through one cell of a two-cell battery embodying my invention.

While cathodes of the type described are resistant to the absorption of electrolyte, they are not necessarily resistant to the absorption of moisture or water, consequently, they are subject to deterioration from the absorption of moisture or water that condenses on the exposed portion thereof in the cell above the electrolyte.

The objects of this invention are attained by providing the cover of a battery of the type described with a depending projection that extends downward within the battery to a point below the surface of the electrolyte, and then supporting the cathode in an opening therein so that it extends both downward into the electrolyte and upward to the outer atmosphere. All openings between the cathode and the cover and between the cover and the casing are closed by a seal such as a thermoplastic compound.

By extending the support for the cathode from the cover to the surface of electrolyte or below, no portion of the cathode is exposed to the atmosphere in the cell and, consequently, the cathode is not subject to deterioration from absorption of moisture or water within the cell.

When a battery of this type is refilled with water to replace liquid lost by evaporation or other causes, there is a tendency, due to imperfect mixing, to form a layer of dilute electrolyte at the top, with greater power of electrode penetration. The present projection offers some degree of protection from absorption under this condition.

As no portion of the electrode is exposed within the cell above the electrolyte, the detrimental effect caused by the creepage of electrolyte up the side of the cathode is consequently eliminated.

As the efficacy of such an electrode depends partially on the distance from the atmosphere to the active electrode surface thereof, my improved mounting for the electrode increases the effectiveness thereof by reducing this distance. This is a material advantage as in my improved cell the surface of the electrode exposed to the atmosphere may be but a very short distance above the surface of the electrolyte, thereby reducing the distance from the atmosphere to the active surface of the electrode to a minimum.

One example of the embodiment of my invention is shown in the accompanying drawing, in which, 10 is a battery casing provided with compartments for two identical cells, only one of which is shown. A cover 11 is carried within the upper portion of the casing 10 on a ledge 21. This cover 11 is provided with a filler opening 18 that is normally closed by a screw cap 19, and thermoplastic compound 17 flowed over the top of the cover 11 closes or seals the annular opening between the cover 11 and the casing 10. One or more anodes 13 are carried by receptacles in the wall of the casing 10 so that they are immersed in electrolyte 12.

On the underside of the cover 11 a depending integral projection 14 is provided that extends downward below the surface of the electrolyte 12. This projection has an opening therethrough that extends upward through the cover, and around the upper edge of this opening a dam or rim 20 is provided to prevent the thermoplastic compound 17 from accidentally flowing into this opening and onto the cathode which will be described presently.

Within the projection 14 a carbon cathode 15 is secured by means of thermoplastic compound 16 which seals the opening between the cathode and the projection. In practice, another support for the cathode may be provided such as a metal rod that extends across the casing 10 and is carried by suitable projections or sockets thereon.

The anodes 13 may be supported from the cover 11 and additional supports therefor may be provided within the battery. Similarly, additional supports may be provided for the cathode 15. This cathode may extend upward into the projection 14 only a short distance or it may extend upward to the top of the battery or even above.

When two cells of this type are assembled in one case, such as shown in part in the illustration, the cells are usually connected in series by means of conductors embedded in the thermoplastic compound 17, and one electric terminal of these cells is connected to one binding post such as 23 at one end of the casing, and the other electric terminal of the cells is connected by suitable conductors to another similar binding post at the other end of the casing. These connections, however, form no part of the invention and, therefore, for sake of simplicity are not shown.

My invention is shown applied to a cell having caustic alkali liquid electrolyte sealed therein, but it may be applied to cells having electrolyte with a different active ingredient or an electrolyte in a different form, such as paste or gel, and the electrolyte may be simply enclosed in a cell that is not sealed or the cell may be shipped dry without an electrolyte or without the liquid portion of an electrolyte.

I claim:

1. In an air depolarized cell having a casing with a cover thereon; a caustic alkali liquid electrolyte sealed therein; and an anode immersed in said electrolyte; a projection depending from said cover and extending downward below the surface of said electrolyte and provided with an opening below said surface and a gas pervious electrolyte-repellent cathode carried by said projection in said opening and extending downward into said electrolyte and upward to the outer atmosphere.

2. In an air depolarized cell having a casing with a cover thereon; a liquid electrolyte sealed therein, and an anode immersed in said electrolyte; a projection integral with said cover and extending downward below the surface of said electrolyte; said projection having an opening below the surface of said electrolyte; a gas pervious electrolyte-repellent carbon cathode in said opening and extending downward into said electrolyte and exposed to the outer atmosphere; and an elastic compound between said electrode and said projection.

3. In an air depolarized cell having a casing with a cover thereon; a liquid electrolyte therein, and an anode immersed in said electrolyte; a hollow projection extending downward from said cover below the surface of said electrolyte; a gas pervious electrolyte-repellent cathode in said projection and exposed both to said electrolyte and the outer atmosphere; and means for sealing the opening between said cathode and said projection.

4. In an air depolarized cell having a casing with a cover thereon; an electrolyte therein; a projection carried by said cover and extending downward within said cell below the surface of said electrolyte and provided with an opening below said surface; and a gas pervious electrolyte repellent cathode carried in the opening in said projection and exposed to both said electrolyte and the outer atmosphere.

5. In an air depolarized cell having a casing with a cover thereon; an electrolyte therein; a projection extending downward from said cover below the surface of said electrolyte and having an opening therethrough extending from below the surface of said electrolyte upward through said cover; and a gas pervious electrolyte-repellent cathode carried by said projection in said opening.

GEORGE W. HEISE.